(12) United States Patent
Goettke et al.

(10) Patent No.: US 11,612,903 B2
(45) Date of Patent: Mar. 28, 2023

(54) DISPENSER FOR DISPENSING FLOWABLE, FOR EXAMPLE LIQUID OR PASTE-LIKE, COMPOUNDS

(71) Applicant: RPC Bramlage GmbH, Lohne (DE)

(72) Inventors: Sabine Goettke, Lohne (DE); Martin Presche, Dinklage (DE)

(73) Assignee: RPC Bramlage GmbH, Lohne (DE)

( * ) Notice: Subject to any disclaimer, the term of this patent is extended or adjusted under 35 U.S.C. 154(b) by 91 days.

(21) Appl. No.: 17/426,263

(22) PCT Filed: Jan. 24, 2020

(86) PCT No.: PCT/EP2020/051702
§ 371 (c)(1),
(2) Date: Jul. 28, 2021

(87) PCT Pub. No.: WO2020/156935
PCT Pub. Date: Aug. 6, 2020

(65) Prior Publication Data
US 2022/0048058 A1 Feb. 17, 2022

(30) Foreign Application Priority Data

Jan. 29, 2019 (DE) ...................... 10 2019 102 184.7
Nov. 28, 2019 (DE) ...................... 10 2019 132 343.6

(51) Int. Cl.
*B05B 11/00* (2023.01)
(52) U.S. Cl.
CPC ...... *B05B 11/3074* (2013.01); *B05B 11/3077* (2013.01); *B05B 11/00416* (2018.08)
(58) Field of Classification Search
CPC .. B05B 11/3074; B05B 11/3077; F16F 1/028; F16F 1/3732; F16F 1/377
(Continued)

(56) References Cited

U.S. PATENT DOCUMENTS

| 4,901,987 A | 2/1990 | Greenhill et al. |
| 5,622,358 A | 4/1997 | Komura et al. |

(Continued)

FOREIGN PATENT DOCUMENTS

| CN | 107264970 A | 10/2017 |
| DE | 10 2005 049 531 A1 | 10/2006 |

(Continued)

OTHER PUBLICATIONS

International Search Report of PCT/EP2020/051702, dated May 6, 2020.

*Primary Examiner* — Lien M Ngo
(74) *Attorney, Agent, or Firm* — Collard & Roe, P.C.

(57) ABSTRACT

A dispenser for dispensing flowable, for example liquid or paste-like, compounds, includes a storage reservoir for receiving the compound, and a preferably modular dispenser pump having an inlet channel and an outlet channel and a pump chamber delimited on the inlet and the outlet side by valves, and also having a head piece, the head piece having a dispensing opening, and a restoring device formed by a spring is further provided between the head piece and the storage reservoir. The restoring device is formed by a plastic spring having a lower spring washer and an upper spring washer, which are arranged substantially coaxially with one another, a respective plane spanned by each spring washer extending substantially perpendicular to a longitudinal axis of the plastic spring, and furthermore the spring washers being compressibly connected to one another by sprung struts extending over more than 90 degrees in the circumferential direction.

18 Claims, 12 Drawing Sheets

(58) Field of Classification Search
USPC .......... 222/401, 321.1–321.9, 340, 341, 256
See application file for complete search history.

(56) References Cited

U.S. PATENT DOCUMENTS

| | | | | |
|---|---|---|---|---|
| 6,068,250 | A * | 5/2000 | Hawkins | F16F 1/328 267/164 |
| 6,948,639 | B2 | 9/2005 | Albisetti et al. | |
| 7,677,415 | B2 * | 3/2010 | Auer | B05B 11/3094 239/455 |
| 10,753,331 | B2 * | 8/2020 | Iwa | F04B 11/0008 |
| 2007/0021718 | A1 | 1/2007 | Burren et al. | |
| 2009/0102106 | A1 * | 4/2009 | Ohashi | F16F 1/3665 267/153 |
| 2010/0116849 | A1 * | 5/2010 | Lautre | B05B 11/3035 222/207 |
| 2011/0169205 | A1 | 7/2011 | Kempf et al. | |
| 2012/0325861 | A1 * | 12/2012 | Pardonge | B65D 83/48 222/321.7 |
| 2016/0082456 | A1 * | 3/2016 | Tada | B05B 11/3004 222/321.9 |
| 2016/0097434 | A1 * | 4/2016 | Russell | F16F 1/328 267/162 |

FOREIGN PATENT DOCUMENTS

| | | |
|---|---|---|
| EP | 1 351 893 A1 | 10/2003 |
| EP | 1 477 234 A2 | 11/2004 |
| EP | 1 565 270 A1 | 8/2005 |
| FR | 2 969 241 A1 | 6/2012 |
| KR | 10-2013-0041586 A | 4/2013 |
| WO | 2011/104470 A1 | 9/2011 |
| WO | 2013/142871 A1 | 9/2013 |
| WO | 2015/105716 A2 | 7/2015 |

* cited by examiner

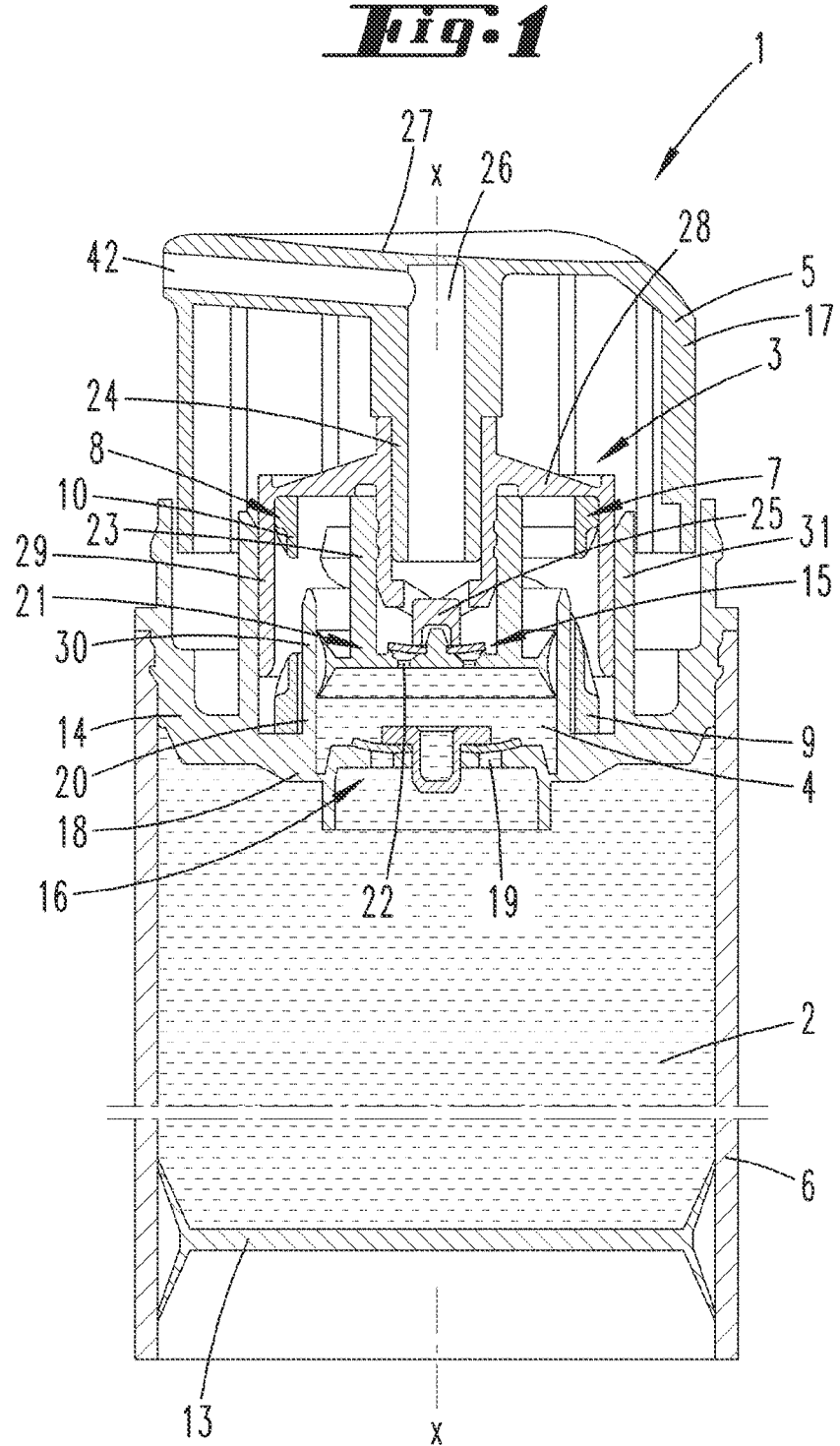

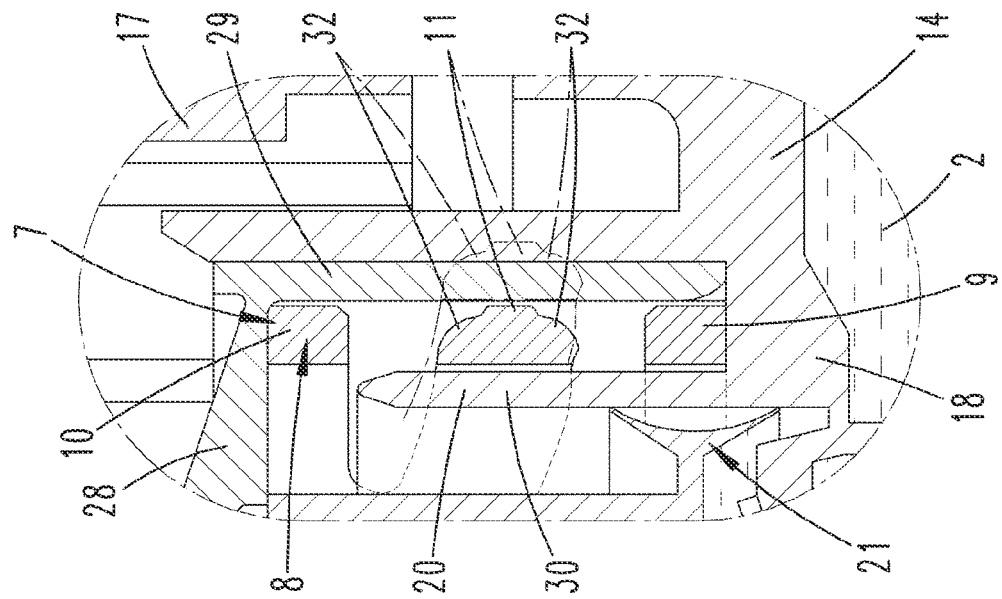
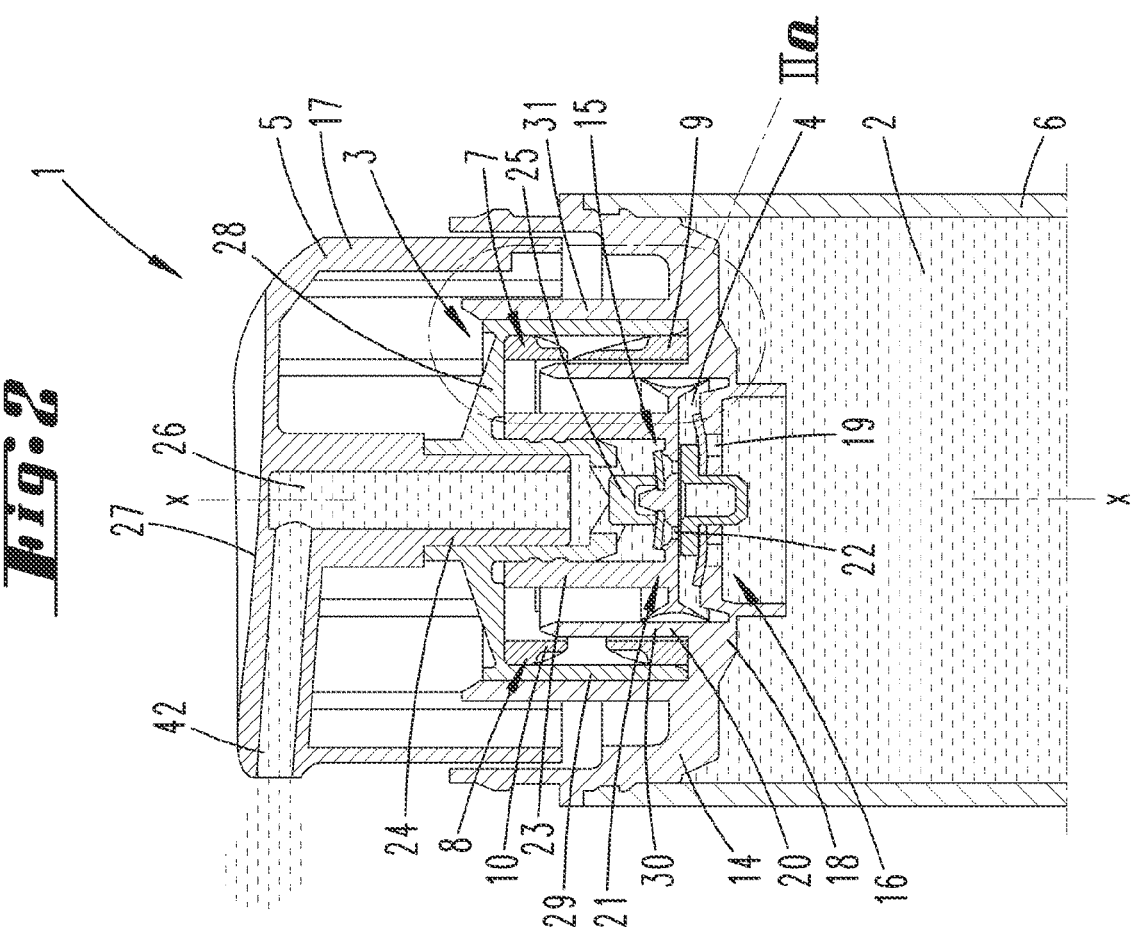

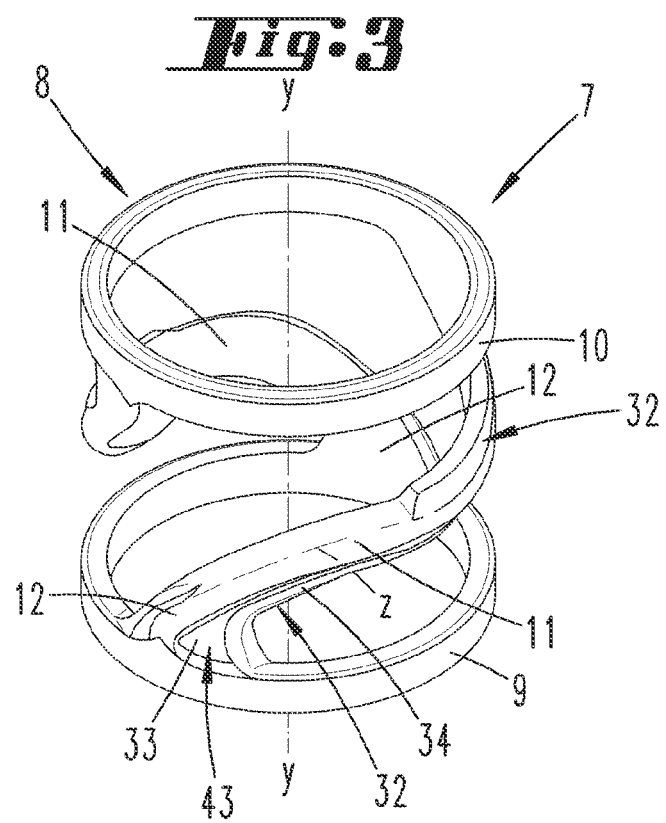
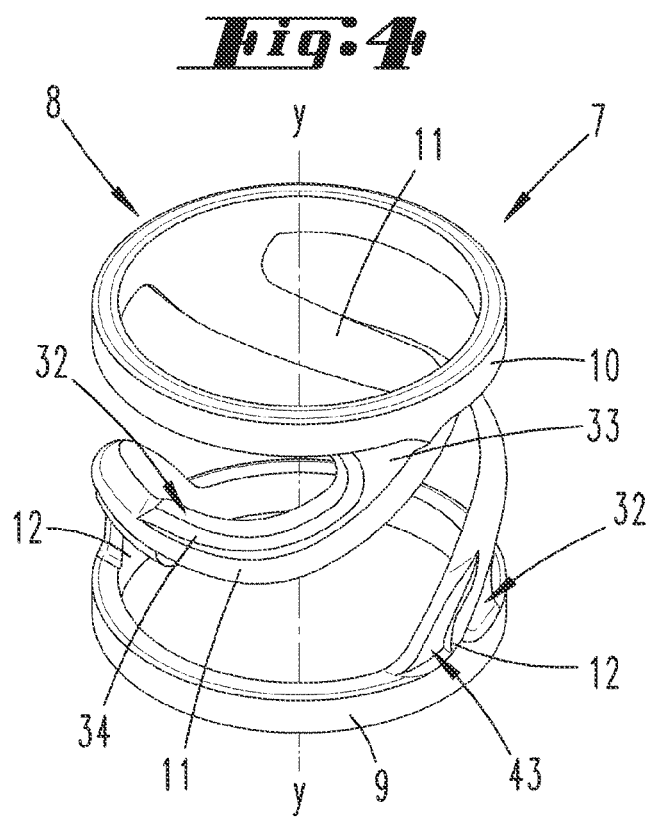

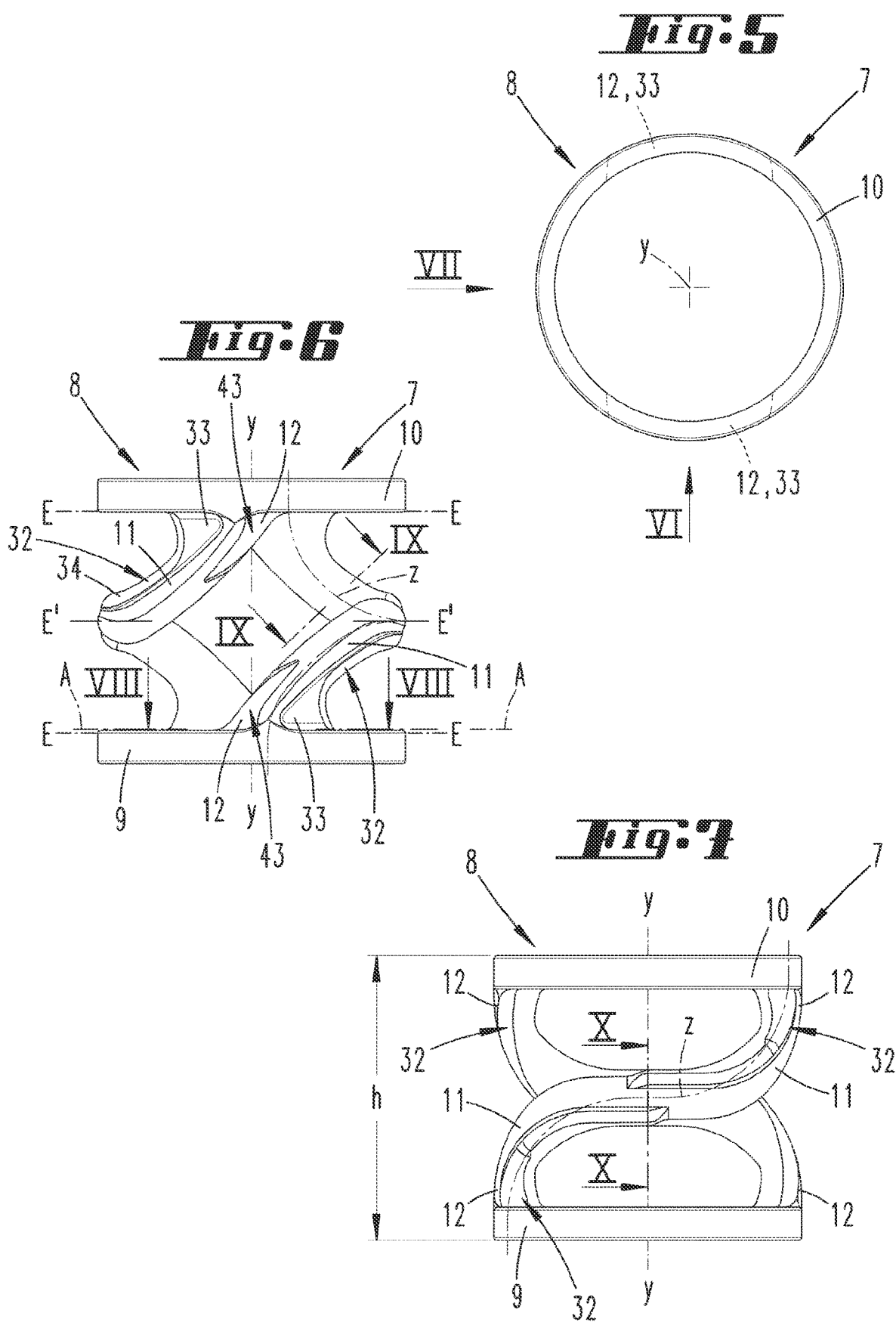

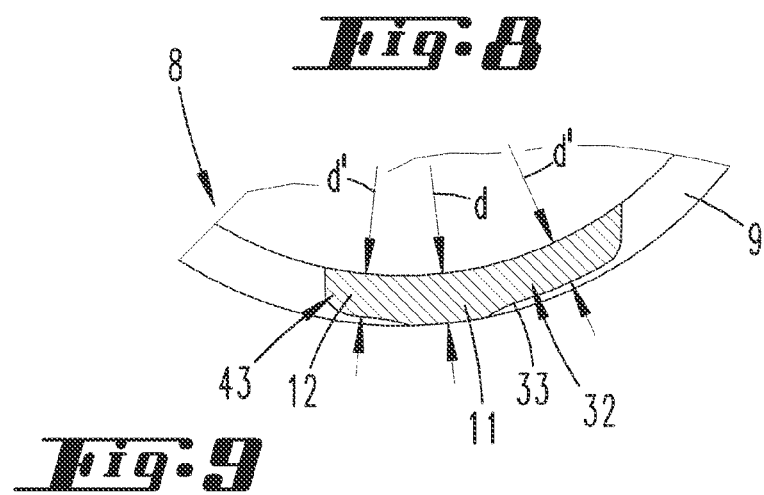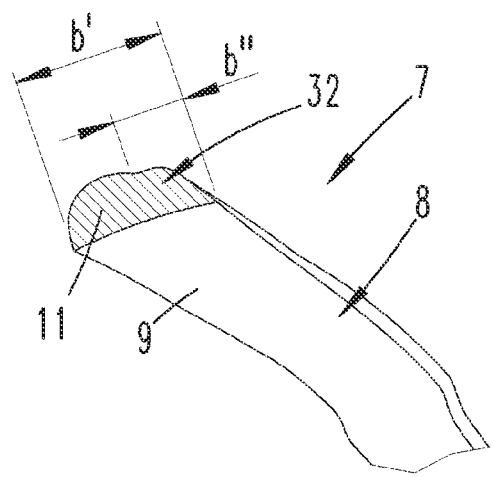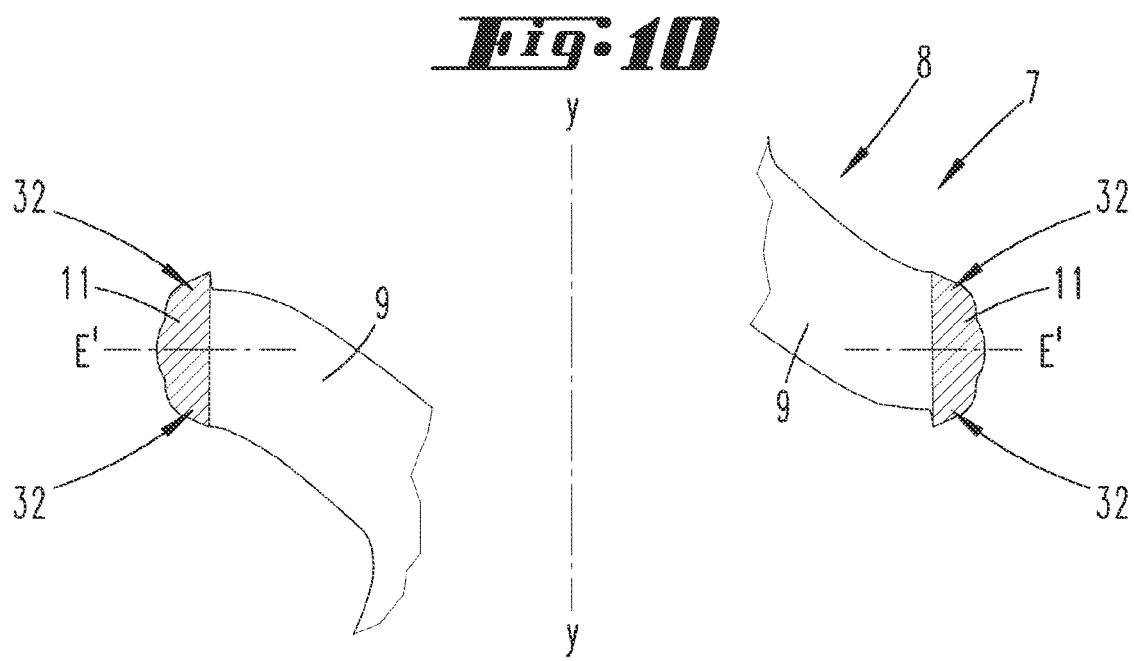

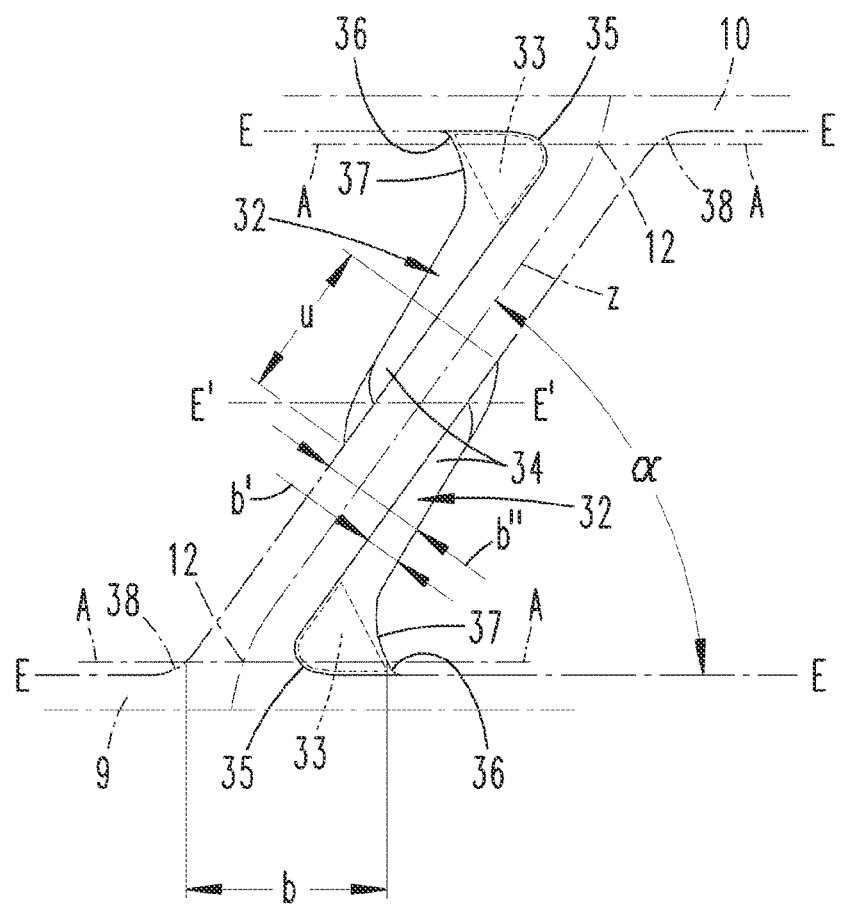

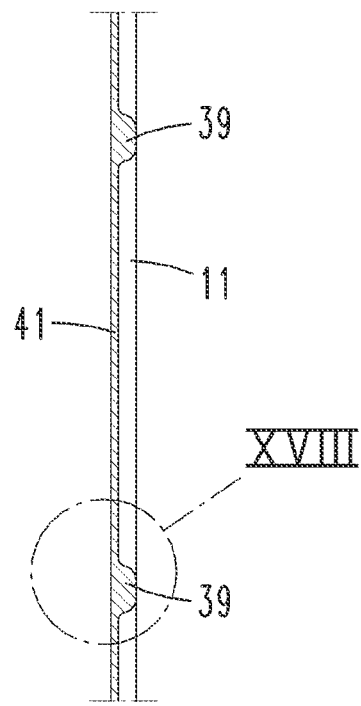
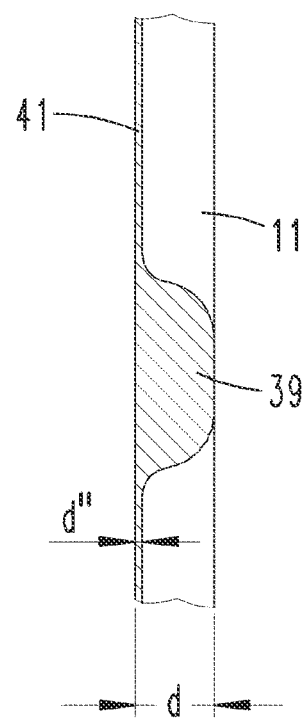
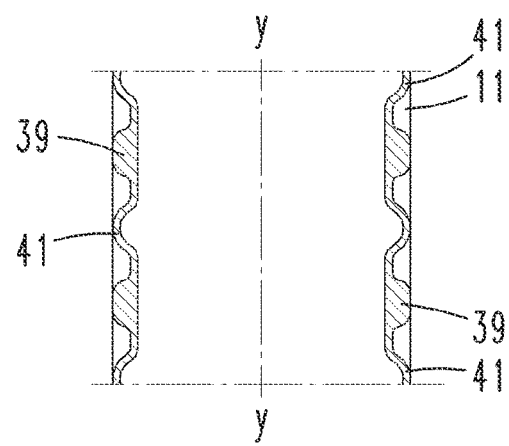

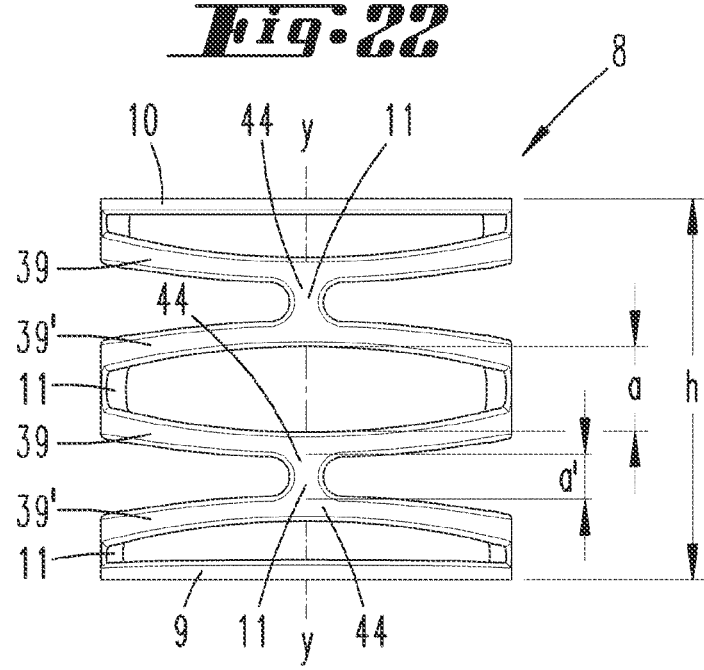
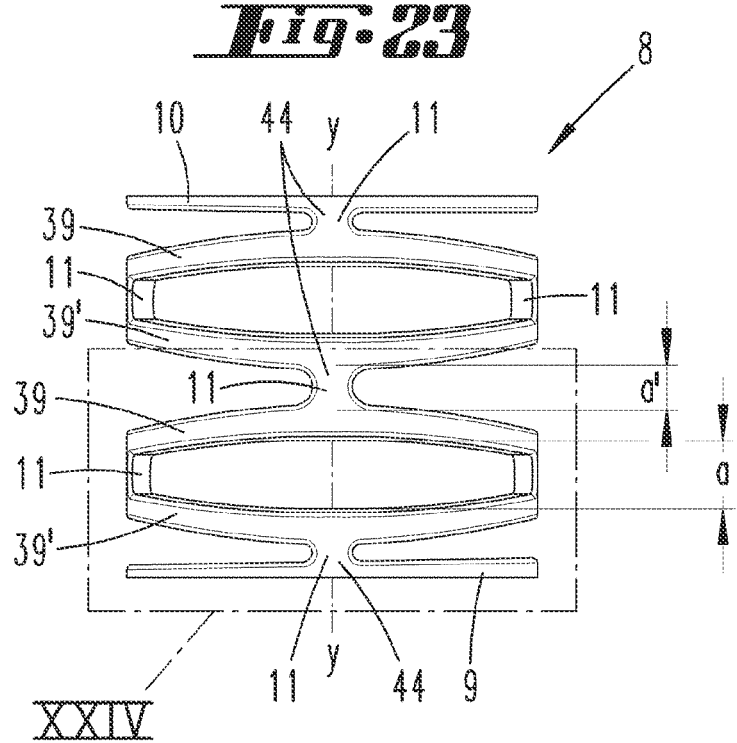

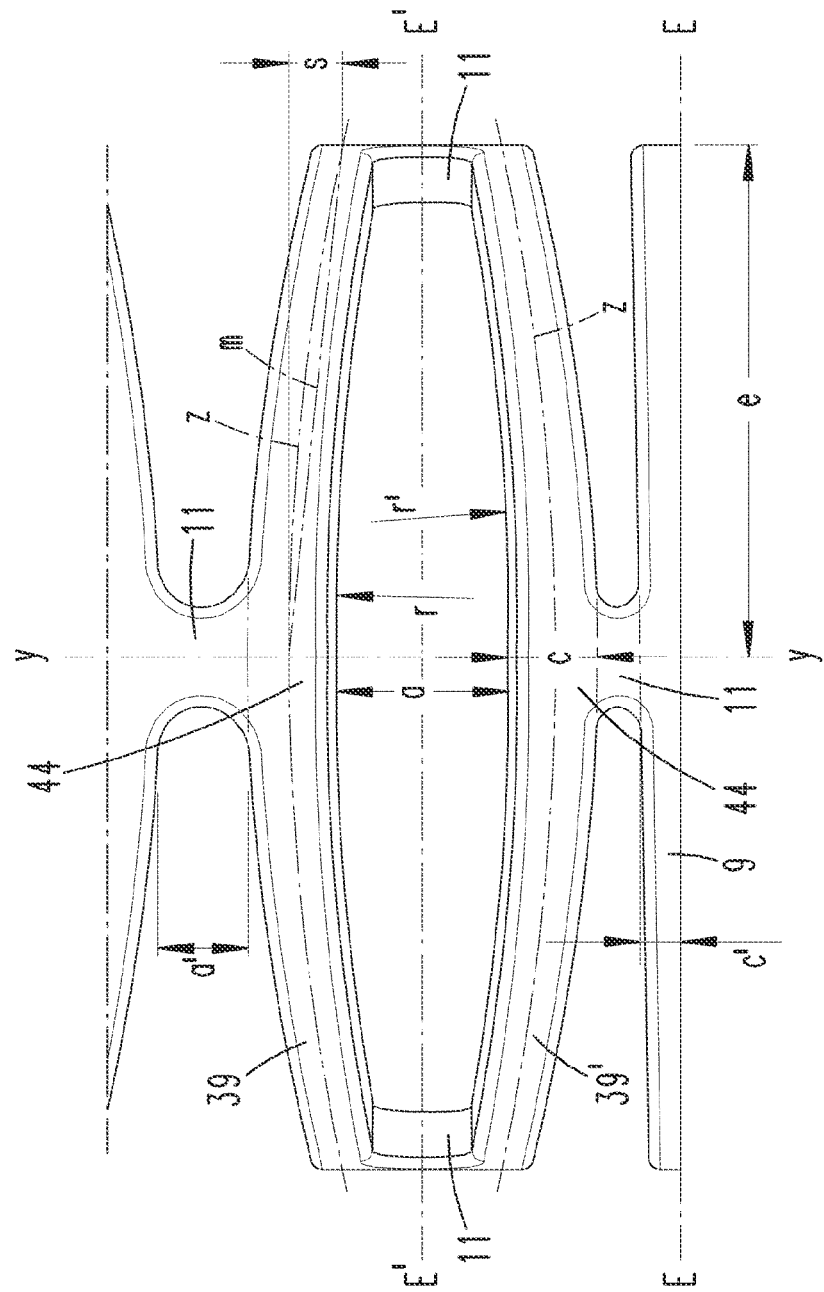

DISPENSER FOR DISPENSING FLOWABLE, FOR EXAMPLE LIQUID OR PASTE-LIKE, COMPOUNDS

CROSS REFERENCE TO RELATED APPLICATIONS

This application is the National Stage of PCT/EP2020/051702 filed on Jan. 24, 2020, which claims priority under 35 U.S.C. § 119 of German Application No. 10 2019 102 184.7 filed on Jan. 29, 2019 and German Application No. 10 2019 132 343.6 filed on Nov. 28, 2019, the disclosures of which are incorporated by reference. The international application under PCT article 21(2) was not published in English.

TECHNICAL FIELD

The invention pertains to a dispenser for dispensing flowable compounds such as liquid or paste-like compounds, comprising a storage reservoir for accommodating the compound and a dispenser pump designed with a preferably modular construction, wherein the dispenser pump has an inlet channel and an outlet channel and a pump chamber, which is delimited by valves on the inlet side and the outlet side, as well as a head piece, wherein the head piece has a dispensing opening, and wherein a restoring device formed by a spring furthermore is provided between the head piece and the storage reservoir.

PRIOR ART

A dispenser of the type in question is known, for example, from DE 10 2005 049 531 A1. Dispensers of this type serve, for example, for dispensing cream such as moisturizing cream or toothpaste in a portioned manner or for dispensing lotions, wherein a follower piston preferably is provided in a container accommodating the compound and the compound is dispensed in a portioned manner by means of a pumping motion of the head piece.

A dispenser known from WO 2013/142871 A1 is provided with a restoring device with a plastic spring, which comprises an upper and a lower spring ring, as well as spring rings that extend over more than 90° in the circumferential direction. An intermediate ring is provided and extends within a plane. The intermediate ring and the upper and lower spring rings respectively have an identical width.

A dispenser known from WO 2011/104470 A1 is provided with multiple intermediate rings, which respectively are connected in direct succession. The intermediate rings and the spring rings have an identical width. With respect to the prior art, we furthermore refer to CN 107264970 A and KR 2013-0041586 A. Only one intermediate ring and no intermediate ring is respectively realized in these publications.

In addition, FR 2 969 241 A1 discloses a dispenser with a plastic spring, in which spring struts only extend over less than 90° in the circumferential direction. The spring struts also have an identical width, which even is slightly smaller in the run-in region, over their longitudinal extent.

SUMMARY OF THE INVENTION

Based on the above-described prior art, the invention aims to advantageously design a dispenser of the respectively implied type with respect to a plastic spring used.

This objective is initially attained with the object according to one aspect of the invention, in which it is proposed that two intermediate rings, which follow one another in the direction of the longitudinal axis, are curved in opposite directions, that two spring struts, which lie diametrically opposite of one another with respect to the longitudinal axis, are provided in each connecting plane between two intermediate rings, and that a width of an intermediate ring measured in the direction of the longitudinal axis is greater than a width of the lower and/or upper spring ring measured in the same direction by 10 percent or more.

The above-defined objective is also attained with the object of another aspect of the invention, in which it is proposed that a run-in region between a spring strut and a spring ring has viewed from radially outside and with respect to a circumferential direction of the spring ring a first run-in radius on one side and a second run-in radius on the circumferentially opposite side, wherein the second run-in radius is significantly smaller than the first run-in radius, that the second run-in radius is with respect to the cross section in the run-in plane formed on a reducing section of the cross section, and that the reducing section has a branch of approximately constant width in the continuing longitudinal extent of the spring strut.

The above-defined objective is furthermore attained with the object of a further aspect of the invention, in which it is proposed that the plastic spring is closed in the circumferential direction by means of wall regions that connect the spring struts to the spring rings.

The plastic spring can be easily and inexpensively manufactured with respect to the manufacturing technology, e.g. in a plastic injection molding process. The plastic spring provides an optimal spring characteristic, in which an increase of the spring force initially takes place in the course of a depression and a constant force can subsequently be generated during the further depression.

The plastic spring may be inserted into the dispenser with preload. Due to the chosen construction, a plastic deformation of the plastic spring may initially also occur during a first compression for generating the preload and optionally also during subsequent first actuations, which are still carried out in the course of the manufacture. The proportion of the plastic deformations decreases significantly with further actuations. In contrast to conventional steel springs, such a plastic deformation of the plastic spring is not or not substantially associated with a hardness increase.

Such a plastic spring preferably can be manufactured integrally and uniformly in material, for example in a plastic injection molding process.

An extent of the spring struts over more than 90 degrees in the circumferential direction proves particularly advantageous with respect to a compression characteristic and/or with respect to the molding technology, particularly if a circumferential extent of approximately 180 degrees is realized. With respect to the manufacturing technology, such a design can be advantageously manufactured with a two-jaw mold.

If the plastic spring is designed with intermediate rings that preferably are uniformly distributed over the height of the plastic spring, the spring struts essentially may extend continuously over the entire height of the spring from the lower spring ring to the upper spring ring, preferably with incorporation of the intermediate rings. The intermediate rings preferably can be arranged coaxial to the spring rings and furthermore preferably have the same outside diameter and/or the same inside diameter as the spring rings.

A spring strut may have the tendency to move radially inward or radially outward between the spring rings in the course of a compression of the plastic spring from its unloaded starting position. This tendential motion may with respect to the overall spring travel or the maximum spring travel amount to several tenths of a millimeter and up to several millimeters, e.g. 2 or 3 mm.

Such a radially inward or radially outward motion of the spring strut preferably can be prevented by means of a radially inner and/or radially outer support formation on the dispenser.

The spring coils or the spring struts respectively may contract or bulge radially inward to a certain degree in the course of the compression of the plastic spring. In the installed state, however, this preferably is prevented by a correspondingly provided support formation in the dispenser. As a result, the plastic spring optionally may in the installed state require a higher force with respect to the compression than in the exposed, uninstalled state.

In a potential embodiment, radially inner and radially outer support formations are provided and prevent a radially inward and a radially outward motion of the spring struts. This obstruction alone may in the course of the compression cause a rotational displacement of the lower and/or upper spring ring in the spring seat by a few angular degrees, e.g. by up to 5 or 10 degrees.

The spring struts may run into the lower and/or upper spring ring in a transition section. With respect to a run-in plane that extends perpendicular to a central longitudinal axis following the curved extent of the spring strut, the transition section may in the run-in region into the spring ring have a width that is greater than a width in a cross-sectional region located in the approximate center of the longitudinal extent of the spring strut by 30 percent or more.

In this way, foot-like widening regions are formed—viewed in the circumferential direction—in the transition region from the spring strut into the respective spring ring, wherein said widening regions respectively have a width that significantly exceeds the normal width of the spring strut in an approximately central spring strut section extending freely between the lower and the upper spring ring. For example, a relevant width may correspond to 1.5-times or more, e.g. up to 5-times, the width measured in the approximate center of the longitudinal extent of the spring strut. This central spring strut section preferably can have a smallest relevant width perpendicular to the central longitudinal axis of the spring strut.

For example, the width resulting in the run-in region furthermore may approximately correspond to 1.8-times to 2.5-times, e.g. approximately 2-times, the width in the central region of the spring strut.

An advantageous behavior of the plastic spring is achieved, in particular, with respect to the force development, but in any case also with respect to a plastic deformation. The widened run-in regions particularly lead to an advantageous force transmission from the spring rings into the spring struts and vise versa.

The central longitudinal axis of the spring strut that follows the curved extent may directly in the run-in region extend essentially perpendicular to the circumferential extent of the following spring ring and accordingly at least approximately parallel in space to the longitudinal axis of the plastic spring as a whole. In this case, the central longitudinal axis may directly in the run-in region of the spring strut into the spring ring also include an acute angle of a few angular degrees, e.g. 0.1 to 10 degrees, with a line that intersects the run-in point of the central longitudinal axis into the spring ring and extends parallel to the longitudinal axis of the plastic spring.

Two or more intermediate rings may be provided if the plastic spring is realized with intermediate rings, wherein at least four spring struts may be distributed over the circumference and extend over a circumferential angle range of the spring ring of 90 degrees or less in the direction of the longitudinal axis.

In a preferred embodiment, at least four spring struts are distributed over the circumference in each compartment between a spring ring and an intermediate ring, as well as between two intermediate rings that directly follow one another in the extending direction of the longitudinal axis. The spring strut arrangement accordingly may be identical in each compartment at least with respect to the number and the design of the spring struts.

According to a potential embodiment, three intermediate rings may extend between the lower spring ring and the upper spring ring, wherein said intermediate rings may be uniformly spaced apart from one another and also uniformly spaced apart from the upper and the lower spring ring viewed over the extent of the longitudinal axis.

For example, four to twelve spring struts, preferably six to ten spring struts, particularly eight spring struts, may also be provided in uniform distribution over the circumference.

Other characteristics of the invention are frequently described below, as well as in the description of the figures, in their preferred association with the object of claim 1 and/or the other independent claim or with characteristics of other claims. However, they may also be important in association with only individual characteristics of claim 1 and/or the other independent claim or the respective other claim or independently.

According to an enhancement, the run-in region between spring strut and spring ring, but optionally also between spring strut and intermediate ring, may viewed from radially outside and with respect to a circumferential direction of the spring ring (or intermediate ring) have a first run-in radius on one side and a second run-in radius on the circumferentially opposite side, wherein the second run-in radius is significantly smaller than the first run-in radius.

In this case, the run-in radii may amount to between a few millimeters and up to 10 or 15 mm, e.g. 2, 3 or 5 mm or even 8, 9 or 10 mm, wherein the greatest run-in radius may dimensionally correspond, for example, to 1.5-times to 5-times, furthermore 2-times to 3-times, the smaller run-in radius.

The second, dimensionally smaller run-in radius preferably can be assigned to the pendentive-like transition section between the spring strut and the spring ring, in which the central longitudinal axis following the curved extent of the spring strut includes an acute angle, for example, of 10 or 15 and up to 45 degrees with the plane spanned by the spring ring. Accordingly, the first, dimensionally greater run-in radius may be assigned to the transition section, in which the central longitudinal axis of the spring strut includes an obtuse angle with the plane of the spring ring (respectively viewed in the circumferential direction from radially outside).

The second run-in radius may with respect to the cross section in the run-in plane also be formed on a reducing section of the cross section. The spring strut may in the transition section, particularly in the run-in region, essentially be composed of a cross-sectionally larger region and a region that forms the reducing section and has a smaller cross-sectional area. In this case, the reducing section preferably can be designed such that it faces the above-described pendentive between spring strut and spring ring.

In a view from radially outside, the reducing section may initially and essentially be realized triangularly, preferably with circumferentially opposite rounded contours. In this case, a rounded contour essentially may directly form the second run-in radius.

The triangular shape can at least partially fill the pendentive region between spring strut and spring ring.

The reducing section may also have a branch of approximately constant width in the continuing longitudinal extent of the spring strut, wherein this width may correspond to half or less, preferably one-third or less and up to one-fifth or one-twentieth or less, of a greatest width in the triangular region.

The branch preferably transforms continuously into the triangular section, which essentially fills the pendentive region between spring strut and spring ring at least partially.

According to a preferred embodiment, the branch particularly may extend over only part of the longitudinal extent of the spring strut starting from the triangular region of the reducing section. A relevant length of the reducing section as a whole and accordingly of the triangular section and the branch may correspond to 0.3-times to 0.8-times, furthermore approximately 0.4-times to 0.6-times and optionally 0.5-times, the longitudinal dimension of the spring strut between the run-in planes into the lower and the upper spring ring.

Furthermore, a second triangular region and/or branch may be formed on the opposite side starting from the other spring ring. With respect to the central longitudinal axis of the spring strut and with respect to a cross section perpendicular to this central longitudinal axis, the thusly formed reducing section facing the other spring ring, e.g. the upper spring ring, essentially may be arranged diametrically opposite of the reducing section that faces the other spring ring, e.g. the lower spring ring. Accordingly, an alternating extent of reducing sections may be formed along the spring strut.

The branch of one reducing section can end in a cross-sectional area of the spring strut, wherein the branch of the other reducing section can grow out of said cross-sectional area in the direction of the other spring ring.

In a potential embodiment, the branches of the two reducing sections may partially overlap in the longitudinal extent along the central longitudinal axis, e.g. over 2 to percent, furthermore over 5 percent, of the overall length of the spring strut.

The reducing sections, which are composed of triangular regions and branches, preferably are realized integrally and uniformly in material with the spring strut and therefore preferably with the spring as a whole.

If the plastic spring is designed with two or more intermediate rings, the spring struts respectively may have a circumferential extent of 10 degrees or more and up to 90 degrees, preferably in a range between 10 and 20 degrees, e.g. approximately 15 degrees.

A longitudinal spring strut axis may be formed between the upper spring ring and the lower spring ring with respect to a circumferential extent of the spring strut. This longitudinal axis preferably can be intersected by the spring strut at least twice over the height of the plastic spring. Consequently, a zigzag-like or sine wave-like extent of the spring strut may be formed over the height of the plastic spring. In an exemplary wave-like extent of the spring strut, a half-wave of the spring strut may be formed in each compartment between two rings, i.e. between a spring ring and an intermediate ring or between two successive intermediate rings, and transform into an oppositely directed half-wave in the next compartment, particularly with intersection of the intermediate ring.

The attachment of the rings, i.e. the spring rings and the intermediate rings, to the spring struts preferably is realized integrally and uniformly in material and preferably can be respectively produced in the zenith of a wave of the spring strut.

In this case, the two ends of the spring strut may run into the lower and upper spring ring on the same circumferential side referred to the longitudinal spring strut axis. Alternatively, the ends of a spring strut may run into the spring rings on different circumferential sides referred to the longitudinal axis.

Furthermore, the plastic spring may be closed in the circumferential direction by means of wall regions that connect the spring struts to the spring rings. These wall regions may partially or also completely close the intermediate spaces resulting between the spring struts and the spring rings and/or the intermediate rings in the spring envelope, wherein it is furthermore preferred that these wall regions do not or not substantially influence the properties of the plastic spring with respect to spring force and restorability. In fact, the wall regions act like a thin-walled lining, wherein these wall regions furthermore may be manufactured integrally and uniformly in material with the spring struts and the spring rings.

In this case, a wall region may have a radial thickness that corresponds to less than half and up to one-fiftieth of the radial thickness of a spring strut. The radial thickness furthermore may approximately correspond to one-twentieth to one-thirtieth of the radial thickness of a spring strut. Such a small radial thickness can enable the wall region to fold radially inward or radially outward in the course of a compression process such that a bellows-like effect can be achieved with respect to the wall regions.

According to a potential embodiment, two intermediate rings that follow one another in the direction of the longitudinal axis may be curved in opposite directions.

For example, this oppositely curved extent of two intermediate rings that directly follow one another along or in the direction of the longitudinal axis is formed in a projection of the intermediate rings into a plane, in which the longitudinal axis is illustrated in the form of a line.

Viewed in the direction of the longitudinal axis, a (first) intermediate ring may with respect to the viewing direction have a convex curvature whereas the following (second) intermediate ring may in the same viewing direction have a concave curvature. With respect to the above-described example, the first intermediate ring may also be curved in a concave manner whereas the following second intermediate ring may have a convex curvature.

The respective curvature of the successive intermediate rings may be realized uniformly viewed over the circumference, but alternatively also non-uniformly, wherein the respective slope or sloping extent of the successive intermediate rings may with consideration of the opposite directionality furthermore be realized identically. In this respect, a different sloping extent would alternatively also be possible.

Viewed over the extent of the longitudinal axis, the plastic spring may also have multiple pairs of successive intermediate rings with oppositely directed curvature.

In addition, an intermediate ring may have a concave or convex curvature in a potential projection into the aforementioned plane whereas this intermediate ring may be curved in the opposite direction and accordingly have a convex or concave curvature in another projection into a plane that is rotated about the longitudinal axis by 90 degrees. In this way, a wave-shaped extent of the intermediate ring may be formed over the circumference.

In a preferred identical design of the intermediate rings that follow one another in the longitudinal direction, the aforementioned oppositely directed curvature can be achieved due to an offset of one intermediate ring relative to the other intermediate ring in the circumferential direction about the longitudinal axis, e.g. as a result of a preferred circumferential offset of 90 degrees.

In the context of intermediate rings that extend in a curved manner, in particular, it would furthermore be possible that the intermediate rings are respectively curved in a concave manner or respectively curved in a convex manner viewed from a central plane between two intermediate rings, which extends perpendicular to the longitudinal axis. The longitudinal axis is illustrated in the form of a point in the aforementioned central plane. This design respectively results in concave or convex curvatures of both intermediate rings or circumferential sections of the intermediate rings, which follow one another in the direction of the longitudinal axis, viewed from this central plane in both directions along the longitudinal axis.

In this case, the intermediate rings respectively may be spaced apart from one another by a maximum axial distance in the region of their curvature reversal points (zenith) in a respective convex extent of the curvature and spaced apart from one another by a minimum axial distance in the region of their curvature reversal points in a respective concave extent of the curvature.

In addition, a width of an intermediate ring measured in the direction of the longitudinal axis may according to a potential embodiment be greater than a width of the lower and/or upper spring ring measured in the same direction by 10 percent or more, e.g. by 25 or 50 percent or more. Furthermore, the aforementioned width of an intermediate ring may correspond, for example, to 1.1-times to 2-times the width of a spring ring.

The plastic material used preferably is a polyolefin, particularly PBT (polybutylene terephthalate), PET (polyethylene terephthalate) or also COC (cycloolefin copolymers). Furthermore, polypropylene with filters may also be used. The E-modulus preferably lies between 1900 and 3000 MPA.

The plastic spring has an optimal spring characteristic, in which an increase of the spring force initially takes place in the course of a depression and a constant force can subsequently be generated during the further depression.

The plastic spring advantageously withstands these deformations due to the chosen plastic material.

With respect to the disclosure, the ranges or value ranges or multiple ranges indicated above and below also include all intermediate values, particularly in 1/10 increments of the respective dimension, but optionally also dimensionless. For example, the indication 1.5-times to 5-times also includes the disclosure of 1.6-times to 5-times, 1.5-times to 4.9-times, 1.6-times to 4.9-times, etc., the disclosure of 0.1 to 10 degrees also includes the disclosure of 0.2 to 10 degrees, 0.1 to 9.9 degrees, 0.2 to 9.9 degrees, etc., and the disclosure of 10 to 15 mm also includes the disclosure of 10.1 to 15 mm, 10 to 14.9 mm, 10.1 to 14.9 mm, etc. The respective disclosure may on the one hand serve for defining a lower and/or upper limit of a cited range, but alternatively or additionally also for disclosing one or more singular values from a respectively indicated range.

BRIEF DESCRIPTION OF THE DRAWINGS

The invention is described in greater detail below with reference to the attached drawings that, however, merely show exemplary embodiments. A component, which is described with reference to one of the exemplary embodiments and not replaced with a different component in another exemplary embodiment, is therefore also described as a potentially existing component in this other exemplary embodiment. In the respective drawings:

FIG. 1 shows a longitudinal section through a dispenser with a plastic spring concerning a normal position;

FIG. 2 shows a sectional view according to FIG. 1, however, concerning a dispensing position;

FIG. 2a shows an enlarged detail of the region IIa in FIG. 2, which is rotated about a longitudinal spring axis by 90 degrees;

FIG. 3 shows an individual perspective view of a first embodiment of a plastic spring of the type inserted into the dispenser according to FIGS. 1 and 2;

FIG. 4 shows another perspective view of the plastic spring according to FIG. 3;

FIG. 5 shows a top view of the plastic spring according to the first embodiment;

FIG. 6 shows the side view of the plastic spring according to the arrow VI in FIG. 5;

FIG. 7 shows the side view according to the arrow VII in FIG. 5;

FIG. 8 shows the section along the line VIII-VIII in FIG. 6;

FIG. 9 shows the section along the line IX-IX in FIG. 6;

FIG. 10 shows the section along the line X-X in FIG. 7;

FIG. 11 shows, drawn with dot-dash lines, a developed view of a spring strut with sections of spring rings, into which the spring strut runs, as well as reducing sections of the spring strut drawn with continuous lines;

FIG. 17 shows the section along the line XVII-XVII in FIG. 16;

FIG. 18 shows an enlarged detail of the region XVIII in FIG. 17;

FIG. 19 shows a sectional view according to FIG. 17, however, concerning the compressed position of the plastic spring;

FIG. 22 shows a view of the plastic spring according to the arrow XXII in FIG. 21;

FIG. 23 shows a view of the plastic spring according to the arrow XXIII in FIG. 21; and FIG. 24 shows an enlarged detail of the region XXIV in FIG. 23.

DESCRIPTION OF THE EMBODIMENTS

Figure 12:
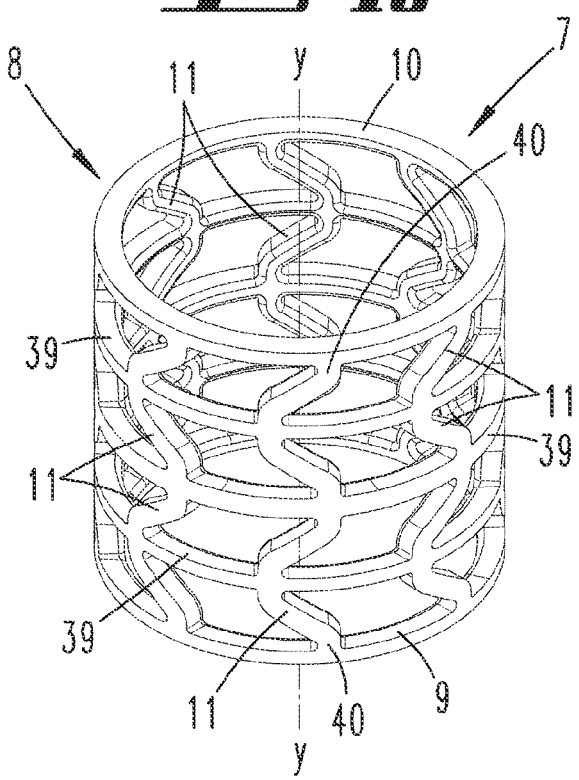
FIG. 12 shows a perspective view of a second embodiment of a plastic spring.

A dispenser 1 for dispensing flowable compounds 2 with a dispenser pump 3, a pump chamber 4 and a head piece 5 is initially described with reference to FIGS. 1 and 2. A restoring device 7 in the form of a plastic spring 8 with a lower spring ring 9 and an upper spring ring 10 is provided between the head piece 5 and a storage reservoir 6 accommodating the compound 2, wherein said spring rings 9 and 10 are compressibly connected to one another by means of spring struts 11.

The exemplary dispenser 1 illustrated in FIG. 1 may have a hollow-cylindrical storage reservoir 6. The dispenser pump 3 is fixed, e.g. screwed or snap-locked, on this storage reservoir. The dispenser pump 3 may be covered with a not-shown cap in the non-usage position according to FIG. 1.

The molded parts of the dispenser 1 preferably consist of a plastic material such as polyethylene and preferably are manufactured in an injection molding process. Fundamental exceptions in the exemplary embodiment shown are the valves that may consist of a rubber-like material, which in fact may be a TPE (and insofar can also be used in an injection molding process), but preferably is vulcanized in the exemplary embodiment.

A follower piston 13 may be positioned in the storage reservoir 6 in order to transport the compound 2 to be dispensed in the direction of the dispenser pump 3.

The dispenser pump 3 essentially is composed of a pot-shaped lower part 14, which forms a partition wall with respect to the storage reservoir 6, a pump chamber 4 with an inlet valve 15 and an outlet valve 16 and a head piece 5 that is supported on a restoring device 7 in the form of a plastic spring 8.

The lower part 14, the pump chamber 4, the restoring device 7 in the form of a plastic spring 8 and an outer wall 17 of the head piece 5 may be arranged rotationally symmetrical on a common axis x, wherein said axis x may simultaneously form the body axis of the storage reservoir 6.

The pot bottom 18 of the lower part 14 has a central opening 19, from which slot-like inlet openings originate, e.g. in a star-shaped manner. The latter are covered by a flexible closure disc that forms the inlet valve 15.

A cylinder wall 20 grows out of the pot bottom 18 radially outside the inlet valve 15 in order to form the pump chamber 4. A pump piston 21 is held in this pump chamber 4 in an axially movable manner.

The pump piston 21 is provided with passage openings 22, which preferably are uniformly distributed about the axis x and form the outlet valve 16 together with another flexible closure disc that covers these passage openings on the side facing away from the inlet valve 15. This outlet valve 16 is enclosed by a hollow-cylindrical pump piston part 23 that forms a neck and produces the connection with the head piece 5.

The head piece 5 engages into the pump piston part 23 with a central cylindrical hollow body 24. The head piece 5 and the pump piston 21 are permanently connected in this overlapping region.

In the end region facing the outlet valve 16, the hollow body 24 transforms into a central hold-down device 25, which is directed at the flexible closure disc of the outlet valve 16 and acts upon the associated closure disc.

The hollow body 24 forms a dispensing channel 26. This dispensing channel initially extends axially starting from the end region of the hollow body 24 that faces the outlet valve 16 and subsequently transforms into a region that runs out laterally and has a dispensing opening 42 on its end. This region is arranged directly underneath an actuating surface of the head piece 5, which is inclined relative to a plane extending perpendicular to the axis x.

The head piece 5 and the pump piston 21 connected thereto are spring-loaded in the direction of the upper contact position. This load is generated by the restoring device 7 in the form of a plastic spring 8.

The plastic spring 8 is on its bottom side supported in the region of the pot bottom 18 of the lower part 14. On its top side, the plastic spring 8 loads the head piece 5 as a result of acting upon the underside of a collar 28 that is integrally formed on the hollow body 24 and protrudes radially outward.

This collar 28 carries along its circumferential edge a radially outer support formation 29 that is directed from the collar 28 in the direction of the lower part 14.

The support formation 29 and the collar 28 are altogether realized in an approximately pot-like manner with a pot opening that points downward in the direction of the lower part 14.

The diameter of the support formation 29 is increased in comparison with the cylinder wall 20 that furthermore forms a radially inner support formation 30, wherein a radial distance between the inner wall side of the radially outer support formation 29 and an opposite outer wall of the radially inner support formation 30 preferably can be adapted to a greatest radial thickness d of the plastic spring 8 in the region of an upper spring ring 10 and/or a lower spring ring 9 and/or a spring strut 11.

As a result, an annular space extending circumferentially coaxial to the axis x is formed, wherein the plastic spring 8 preferably is accommodated in said annular space.

The radially outer support formation 29 may be circumferentially encompassed by a guide wall 31 on its radially outer side, wherein said guide wall axially grows out of the pot bottom 18 in the direction of the head piece 5.

The function of the dispenser 1 is known to the extent that a portioned quantity of paste-like compound 2 is dispensed due to a pumping motion of the head piece 5 and the associated change between underpressure and overpressure. An overpressure is generated in the pump chamber 4 due to the application of pressure upon the head piece 5 and the associated downward displacement thereof, wherein the portion stored in this pump chamber 4 can be discharged through the opened outlet valve 16 and the outlet channel 26 as a result of said overpressure. The inlet valve 15 is closed as a result of this overpressure.

The downward displacement of the head piece 5 with the pump piston 21 takes place against the restoring force of the plastic spring 8.

After the force acting upon the head piece 5 is discontinued, this head piece automatically returns into the starting position due to the spring action.

The plastic spring 8 according to the first embodiment illustrated in FIGS. 3 to 11 initially and essentially has a lower spring ring 9 and an upper spring ring 10, which are aligned coaxial to a longitudinal axis y. In the installed state, the longitudinal axis y coincides with the axis x of the dispenser 1.

The spring rings 9 and 10 are aligned in such a way that a respective plane E spanned by a spring ring 9 or 10 essentially extends perpendicular to the longitudinal axis y.

The spring rings 9, 10 are spaced apart from one another in the axial direction and compressibly connected to one another by means of spring struts 11.

The plastic spring 8 has two such spring struts 11 in the exemplary embodiment shown. Viewed in the circumferential direction of the plastic spring 8, each spring strut 11 extends over more than 90 degrees, preferably over up to approximately 180 degrees, along its extent from the lower spring ring 9 to the upper spring ring 10.

In this case, each spring strut 11 may have a geometric central longitudinal axis z that follows the curved extent, for example, from the transition section 12 into the lower spring ring 9 to the transition section 12 into the upper spring ring 10.

In a side view, in which the planes E, as well as the central longitudinal axis z, are illustrated in the form of lines, each spring strut 11 may with respect to this central longitudinal axis z include an acute angle α of approximately 15 to 45 degrees, furthermore approximately 30 to 45 degrees, with the respective spring ring 9 or 10 or with the plane E spanned by the spring rings.

The spring strut 11 of the plastic spring 8 is in the annular space between the cylinder wall 20 and the guide wall 31 supported in the radial direction, particularly radially outward, by the guide wall 31. Accordingly, the spring strut 11 or both spring struts 11 preferably can be prevented from carrying out a radial excursion, particularly an outward radial excursion, in the course of a spring compression of the type illustrated, for example, in FIG. 2. Such a theoretic radial excursion toward the outside is indicated with a dot-dash line in FIG. 2a.

A rotation of one or both spring rings 9, 10 in their seats may occur, in particular, if the spring struts 11 are radially guided on both sides and the spring struts therefore are prevented from carrying out a radial excursion.

Figure 13:
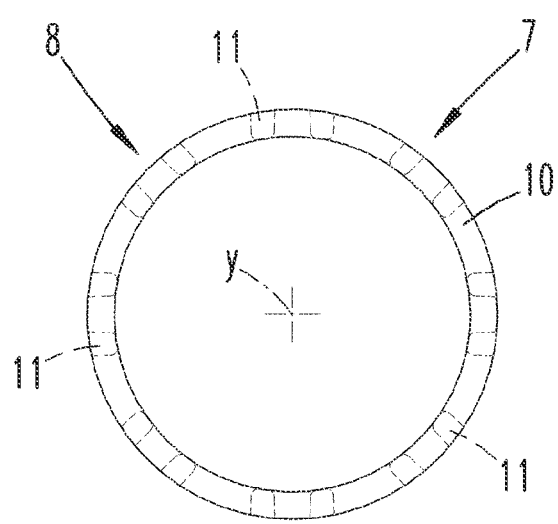
FIG. 13 shows a corresponding top view.
Figure 14:
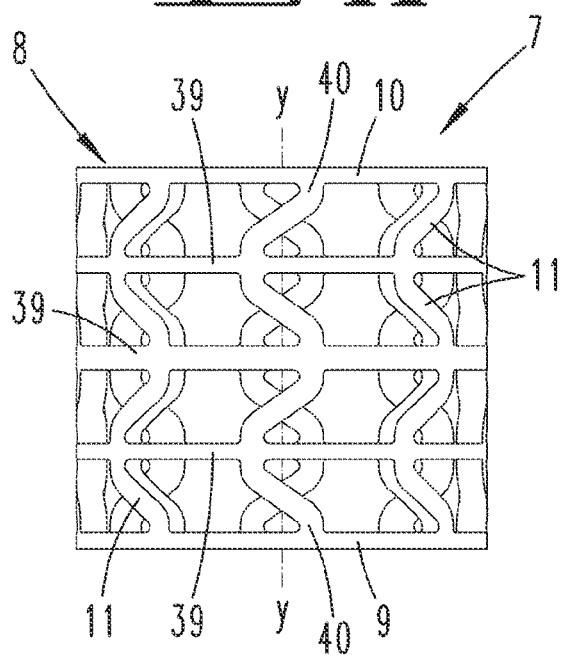
FIG. 14 shows the side view according to the arrow XIV in FIG. 13.
Figure 15:
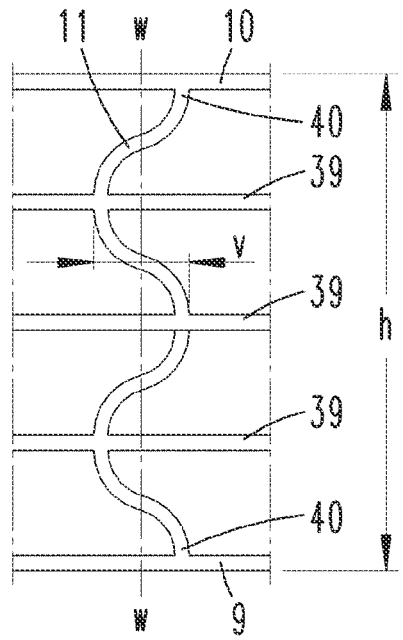
FIG. 15 shows an enlarged individual side view of a spring strut with sections of spring rings and intermediate rings connected to the spring strut.
Figure 16:
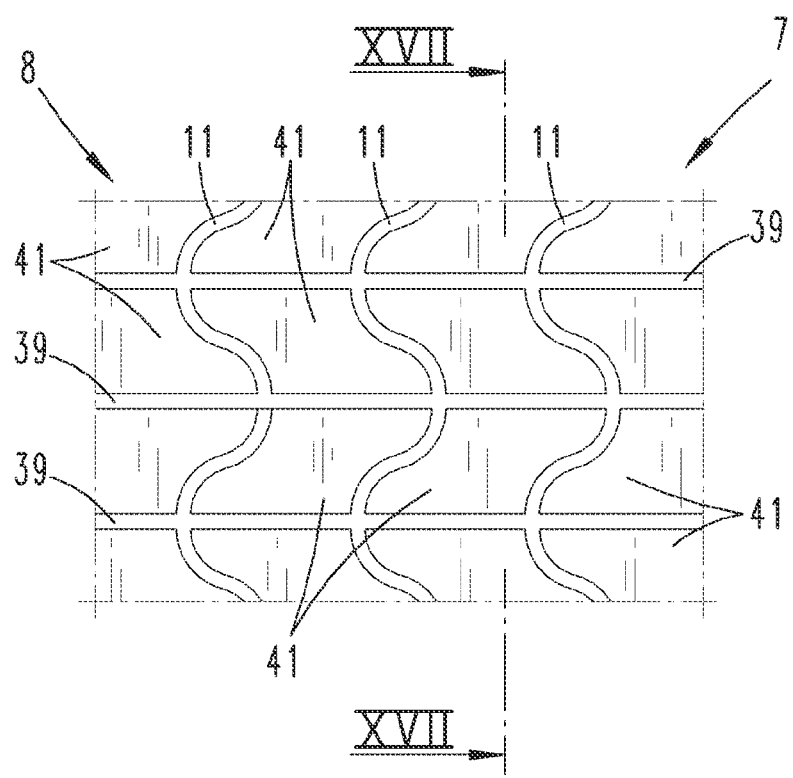
FIG. 16 shows a detailed side view of a third embodiment of a plastic spring.

With respect to a cross section perpendicular to the central longitudinal axis z, each spring strut 11 of the first embodiment illustrated in FIGS. 1 to 11, but optionally also of the other embodiments illustrated in FIGS. 12 to 18, may have at least one reducing section 32. This reducing section 32 may with respect to the longitudinal axis y have a radial thickness d' that corresponds to 0.3-times to 0.95-times, furthermore approximately 0.6-times to 0.9-times, the thickness d of the unreduced section of the spring strut 11.

Furthermore, the reducing section 32 preferably can be realized such that it is assigned to the pendentive region of the respective spring strut 11 with the acute angle α, wherein two such reducing sections 32 preferably can be provided on a spring strut 11 and said reducing sections overlap in the approximate center of the longitudinal extent of the spring strut 11 viewed in the extending direction of the longitudinal axis y.

With respect to a cross section through a spring strut 11 in the central region of the longitudinal extent of the spring strut 11 according to FIG. 10, the reducing sections 32 therefore preferably can lie vertically opposite of one another.

With respect to a view from radially outside, each reducing section 32 may according to the drawings be composed of a triangular section 33 that fills the pendentive region between the spring strut 11 and the respective spring ring 9 or 10 and an adjacent branch 34 that essentially extends along the longitudinal extent of the spring strut 11.

Each triangular region 33 may form circumferentially opposite rounded contours, namely a rounded contour 35 directly in the pendentive-like transition from the unreduced section of the spring strut 11 into the respective spring ring 9 or 10 and, viewed in the circumferential direction, a free rounded contour 36 that altogether forms a second run-in radius 37 for the spring strut 11, wherein the relevant radius dimension may correspond, for example, to 1.5-times to 3-times, furthermore approximately 2-times, the radius dimension in the region of the first rounded contour 35.

Furthermore, each spring strut 11 also has a first run-in radius 38 that is assigned to the obtuse angle between the spring strut 11 and the respective spring ring 9, 10. This first run-in radius is chosen dimensionally greater than the second run-in radius 37 and corresponds, for example, to approximately 1.5-times to 5-times, furthermore approximately 2-times to 3-times, the second run-in radius 37.

The branch 34 located adjacent to the triangular region 33 along the longitudinal extent of the spring strut 11 may—with respect to a cross section perpendicular to the central longitudinal axis z (compare, e.g., to FIG. 9)—have an at least approximately constant width b' over the longitudinal extent of the branch 34, wherein said width may approximately correspond to 0.1-times to 0.5-times, furthermore approximately 0.15-times to 0.25-times, the overall width b" of the spring strut 11 viewed in the same direction including the reducing section 32 in this region.

The branches 34 of the reducing sections 32 may according to the drawings extend beyond a central plane E' that traverses the longitudinal axis y between the planes E. The optionally resulting overlapping dimension u may approximately correspond to the width dimension b', optionally to approximately 3-times to 10-times this width dimension b' of a branch 34.

The enlarged transition section 12 between a spring strut 11 and a spring ring 9, 10, which leads to an advantageous force development in the course of the compression and/or restoration of the plastic spring 8, has in a run-in plane A extending perpendicular to the central longitudinal axis z and preferably parallel to the plane E a width b that is greater than in a cross-sectional region of the spring strut 11 in the approximate center of the longitudinal extent of the spring strut 11 by 30 percent or more, e.g. according to the drawing in FIG. 9. In the region of this run-in plane A and accordingly in a section of the rounded contours 35 and 36 and therefore in a section of the reduced and unreduced regions through the run-in plane A, this greatest width b may have a dimension that corresponds to 1.3-times to 5-times, e.g. approximately 1.5-times 2.5-times, the width b" of the relevant spring strut 11 in a central region, preferably outside the overlapping region of the reducing sections 32.

The drawings furthermore show that a second reducing section 43 may also be formed in the obtusely angled transition from the spring ring 9, 10 into the spring strut 11 with the first run-in radius 38. With respect to the thickness ratio to the unreduced region of the spring strut 11, this second reducing section may be realized identically or approximately identically within the indicated value ranges of the above-described reducing section 32.

The reducing section 43 may starting from the transition section 12 extend over a distance along the spring strut 11 that approximately corresponds to 0.1-times to 0.7-times, furthermore approximately 0.2-times to 0.3-times, the length of the first reducing section 32.

FIGS. 12 to 15 show another embodiment of the restoring device 7. In this case, the restoring device preferably is also a plastic spring 8 with an upper spring ring 10 and a lower spring ring 9, which preferably extend offset to one another along a longitudinal axis y in identical planes.

In the exemplary embodiment shown, intermediate rings 39 extending essentially perpendicular to the longitudinal axis y are provided over the height h of the plastic spring 8 and accordingly over the length of the longitudinal axis y. Three intermediate rings 39 of this type may be provided in accordance with the exemplary embodiment shown. In this respect, it would alternatively also be possible to provide only two or more than three and up to five or six intermediate rings 39 of this type.

The spring rings 9, 10 and the intermediate rings may be designed identically with respect to their outside and/or the inside diameters.

The spring rings 9 and 10 and the intermediate rings 39 preferably are uniformly spaced apart from one another in the longitudinal direction of the longitudinal axis y and connected to one another by means of spring struts 11.

Eight spring struts 11 of this type may be provided in uniform distribution over the circumference as shown.

Each spring strut 11 is connected to each spring ring 9, 10 and each intermediate ring 39, particularly integrally and uniformly in material.

Viewed in the circumferential direction, each spring strut 11 may extend over a circumferential angle range of approximately 15 to 20 degrees or more, e.g. up to 45 or 60 degrees.

With respect to a view from radially outside, each spring strut 11 furthermore may extend in a zigzag-shaped or wave-shaped manner, wherein a respective half-wave optionally may be assigned to a free region between two rings, e.g. between a spring ring 9 or 10 and an intermediate ring 39 or also between two intermediate rings 39.

With respect to a circumferential extent of the spring strut 11, a longitudinal spring strut axis w may be formed between the upper spring ring 10 and the lower spring ring 9, wherein said longitudinal spring strut axis may be intersected by the spring strut 11 multiple times over the height h of the plastic spring 8, namely four times in the exemplary embodiment shown. Such an intersection preferably is formed at half the extent of a spring strut section between two rings (compare, in particular, to FIG. 15).

An attachment to an intermediate ring 39 may be respectively realized in the region of a wave crest and/or a wave trough.

The two ends 40 of a thusly designed spring strut 11 may run into the lower and/or the upper spring ring 9, on the same circumferential side referred to the longitudinal spring strut axis w as shown.

According to the drawings in FIGS. 17 to 19, the free spaces formed between the spring rings 9, 10 and the spring struts 11 and furthermore also the free spaces formed with incorporation of the intermediate rings 39 may be closed by means of wall regions 41 that connect the spring struts 11 and the rings. These wall regions 41 preferably can be realized integrally and uniformly in material with the spring struts 11 and the rings, wherein the wall regions 41 furthermore may be realized in a skin-like manner. Accordingly, the wall regions 41 may have a radial thickness d" that corresponds, for example, to one-fifth to one-twentieth or less, e.g. one-tenth, of the radial thickness d of a spring strut 11 and/or a spring ring 9, 10 and/or an intermediate ring 39 (compare, in particular, to FIG. 18).

During a compression of the plastic spring 8 of the type illustrated in the enlarged detail according to FIG. 19, such a comparatively thin and optionally skin-like wall region 41 is able, for example, to fold radially outward between the intermediate rings 39, the spring rings 9, 10 and the spring struts 11 similar to a bellows.

In a dispenser 1 according to the initially described exemplary embodiment, the arrangement of the valves 15 and 16 can be eliminated by using an above-described plastic spring 8 with wall regions 41 that fill out the free spaces. The thusly realized plastic spring 8 not only acts as a restoring device 7, but furthermore also as a bellows of sorts that builds up an underpressure for feeding the compound 2 during the restoring motion.

Figure 20:
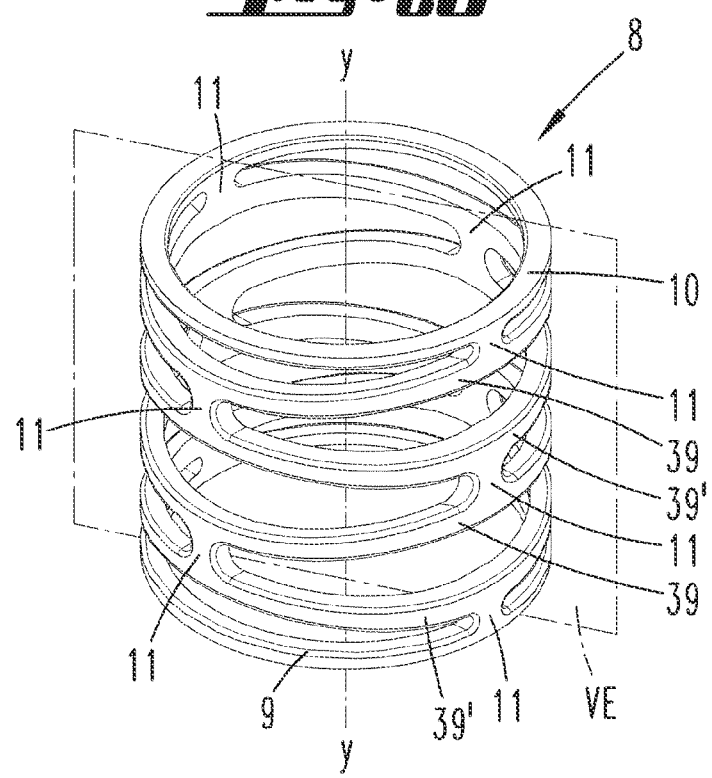
FIG. 20 shows a perspective view of another embodiment of a plastic spring.
Figure 21:
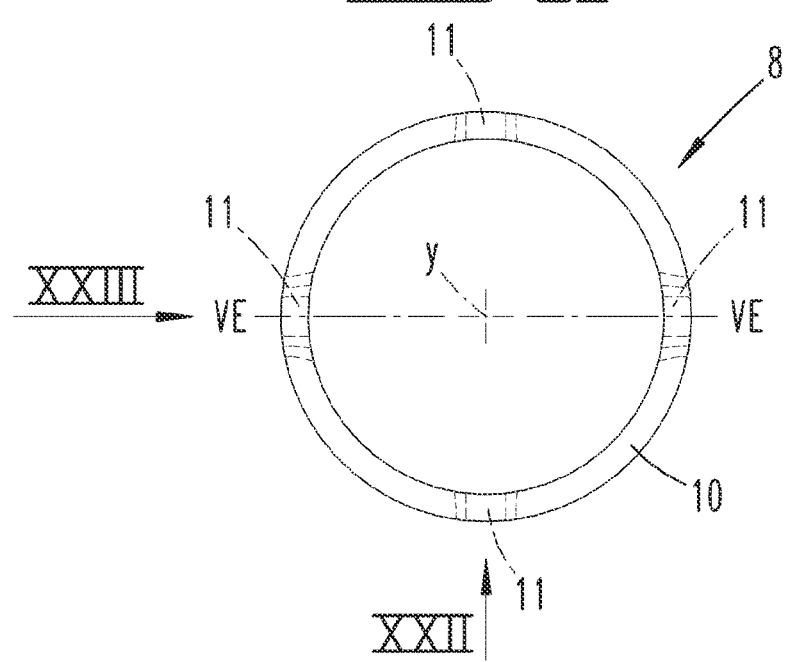
FIG. 21 shows a top view of the plastic spring according to FIG. 20.

FIGS. 20 to 24 show another embodiment of a plastic spring 8 with a lower spring ring 9 and an upper spring ring 10, wherein said spring rings 9 and 10 also extend in a plane E that essentially extends transverse to the longitudinal axis y in this exemplary embodiment.

Intermediate rings 39 and 39' are provided between the spring rings 9 and 10 over the height h along the longitudinal axis y. These intermediate rings essentially are also aligned along a plane extending transverse to the longitudinal axis y. Four intermediate rings 39 and 39' are provided in the exemplary embodiment shown.

The spring rings 9 and 10 are connected to the respective intermediate rings 39 or 39', which respectively follow said spring rings in the direction r or r' of the longitudinal axis y, by means of spring struts 11. The intermediate rings 39 and 39', which follow one another in the respective direction r or r' of the longitudinal axis y, are also connected to one another by means of such spring struts 11. In the exemplary embodiment shown, two spring struts 11 that lie diametrically opposite of one another with respect to the longitudinal axis y are provided in each connecting plane between two intermediate rings or between a spring ring and an intermediate ring.

The enlarged detail in FIG. 24 particularly shows that the width c of a respective intermediate ring 39 or 39', which is respectively measured in the direction r or r' of the longitudinal axis y, may approximately correspond to 1.5-times to 2.5-times, furthermore approximately 2-times, the width c' of a respective spring ring 9 or 10 measured in the same direction. In a projection of the intermediate rings 39 and 39', as well as the spring rings and 10, into a vertical plane VE, in which the longitudinal axis y is illustrated in the form of a line (compare to FIG. 20), these widths c and c' preferably can be measured along the longitudinal axis y, wherein this width dimension may refer on one end to a resulting outer edge of the respective intermediate ring or spring ring and on the other end to an imaginary extension of an opposite outer edge of the respective intermediate ring or spring ring, which in this projection may optionally run into a spring strut 11.

It is furthermore preferred that the intermediate rings 39 and 39' extend in a curved manner, particularly with respect to the aforementioned projection into the vertical plane VE, wherein the respective intermediate rings preferably have with respect to the circumferential direction an undulating shape with two diametrically opposite concave curvature regions and two likewise diametrically opposite convex curvature regions, which are offset relative to the concave curvature regions by 90 degrees in the circumferential direction. This results in a respective intermediate ring 39 or 39' in the form of a circumferentially undulating spring ring.

The intermediate rings 39 and 39' preferably are designed identically, particularly with respect to their undulating shape in the circumferential direction. According to the exemplary embodiment shown, the intermediate rings 39 may be aligned identically in the circumferential direction whereas the intermediate rings 39' preferably are offset relative to the intermediate rings 39 by 90 degrees about the longitudinal axis y.

Viewed in the direction r (or alternatively also in the direction r') of the longitudinal axis y, two sections of the intermediate rings 39 and 39', which directly follow one another, are curved in opposite directions such that, e.g. viewed in the direction r, a concave curvature region of the intermediate ring 39' lies with respect to the projection into the vertical plane VE opposite of a convex curvature region of the following intermediate ring 39. In this case, a maximum distance a is formed between the intermediate rings 39 and 39', particularly between the curvature reversal regions 44 that in the projection plane according to the drawings are arranged along the longitudinal axis y.

The drawings furthermore show that the intermediate rings 39 and 39', which are arranged directly behind one another in the direction r, extend with a respectively concave or respectively convex curvature from a central plane E', which is aligned transverse to the longitudinal axis y and extends between these intermediate rings 39 and 39', viewed in the respective direction r or r', wherein the maximum distance a is formed between the convex curvature regions viewed in the respective direction r or r' and a minimum distance a' is formed between the concave curvature regions that are directed toward one another.

The spring struts 11 preferably are arranged in such a way that they connect intermediate rings 39 and 39', which follow one another in the direction of the longitudinal axis y, in the region of their convex curvature reversal regions 44. The connection of the lower spring ring 9 or the upper spring ring 10 to the respective intermediate ring 39 or 39', which respectively follows in the direction r or r', preferably is also produced in the convex curvature reversal region 44 of the intermediate ring.

The curvature may concern a uniform rise along the central longitudinal axis z of the intermediate rings. An elongate, uniform undulating shape may be formed with respect to the central longitudinal axis z in a developed view of a respective intermediate ring 39 or 39'. In this case, an average slope m of approximately 7 to 10, furthermore approximately 8 to 9, may be formed in dependence on a radius dimension e that refers to the central longitudinal axis z and furthermore in dependence on a slope dimension s of the central longitudinal axis z in the direction of the longitudinal axis y, wherein this in turn may lead to an average slope of approximately 10 to 13 percent, furthermore approximately 11 to 12 percent.

LIST OF REFERENCE SYMBOLS

1 Dispenser
2 Compound
3 Dispenser pump
4 Pump chamber
5 Head piece
6 Storage reservoir
7 Restoring device
8 Plastic spring
9 Lower spring ring
10 Upper spring ring
11 Spring strut
12 Transition section
13 Follower piston
14 Lower part
15 Inlet valve
16 Outlet valve
17 Outer wall
18 Pot bottom
19 Opening
20 Cylinder wall
21 Pump piston
22 Passage opening
23 Pump piston part
24 Hollow body
25 Hold-down device
26 Dispensing channel
27 Actuating surface
28 Collar
29 Support formation
30 Support formation
31 Guide wall
32 Reducing section
33 Triangular region
34 Branch
35 Rounded contour
36 Rounded contour
37 Second run-in radius
38 First run-in radius
39 Intermediate ring
39' Intermediate ring
40 End
41 Wall region
42 Dispensing opening
43 Reducing section
44 Reversal region
a Distance
a' Distance
b Width
b' Width
b" Width
c Width
c' Width
d Thickness
d' Thickness
d" Thickness
e Radius dimension
h Height
m Slope
r Direction
r' Direction
s Slope dimension
u Overlapping dimension
v Circumferential angle range
w Longitudinal spring strut axis
x Axis
y Longitudinal axis
z Central longitudinal axis
A Run-in plane
E Plane
E' Central plane
VE Vertical plane
α Angle

The invention claimed is:

1. A dispenser (1) for dispensing flowable compounds (2) or liquid or paste-like compounds, comprising a storage reservoir (6) for accommodating the compound (2) and a dispenser pump (3) designed with a modular construction, wherein the dispenser pump (3) has an inlet channel and an outlet channel (26) and a pump chamber (4), which is delimited by valves (15, 16) on the inlet side and the outlet side, as well as a head piece (5), wherein the head piece (5) has a dispensing opening (42), wherein a restoring device (7) formed by a spring furthermore is provided between the head piece (5) and the storage reservoir (6), wherein the restoring device (7) is formed by a plastic spring (8) with a lower spring ring (9) and an upper spring ring (10), which are arranged substantially coaxial to one another, wherein a respective plane (E) spanned by the spring rings (9, 10) extends substantially perpendicular to a longitudinal axis (y) of the plastic spring (8), wherein multiple intermediate rings (39, 39'), which extend substantially transverse to the longitudinal axis (y) of the plastic spring (8), are formed over the height (h) of the plastic spring (8), and wherein the spring rings (9, 10) and the intermediate rings (39, 39') are connected to one another by spring struts (11) extending between the intermediate rings (39, 39'), as well as between the spring rings (9, 10) and the intermediate rings (39, 39'), wherein two intermediate rings (39, 39'), which follow one another in the direction (r) of the longitudinal axis (y), are curved in opposite directions, wherein two spring struts (11), which lie diametrically opposite of one another with respect to the longitudinal axis (y), are provided in each connecting plane between two intermediate rings (39, 39'), and wherein a width (c) of an intermediate ring (39, 39') measured in the direction (r) of the longitudinal axis (y) is greater than a width (c') of the lower and/or upper spring ring (9, 10) measured in the same direction (r) by 10 percent or more.

2. The dispenser according to claim 1, wherein the intermediate rings (39, 39') are respectively curved in a concave manner or respectively curved in a convex manner viewed from a central plane (E') between two intermediate rings (39, 39'), which extends perpendicular to the longitudinal axis (y).

3. A dispenser (1) for dispensing flowable compounds (2) or liquid or paste-like compounds, comprising a storage reservoir (6) for accommodating the compound (2) and a dispenser pump (3) designed with a modular construction, wherein the dispenser pump (3) has an inlet channel and an outlet channel (26) and a pump chamber (4), which is delimited by valves (15, 16) on the inlet side and the outlet side, as well as a head piece (5), wherein the head piece (5) has a dispensing opening (42), wherein a restoring device (7) formed by a spring furthermore is provided between the head piece (5) and the storage reservoir (6), wherein the restoring device (7) furthermore is formed by a plastic spring (8) with a lower spring ring (9) and an upper spring ring (10), which are arranged substantially coaxial to one another, wherein a respective plane (E) spanned by the spring rings (9, 10) extends substantially perpendicular to a longitudinal axis (y) of the plastic spring (8), and wherein the spring rings (9, 10) furthermore are compressibly connected to one another by spring struts (11) extending over more than 90 degrees in the circumferential direction, wherein a run-in region between a spring strut (11) and a spring ring (9, 10) has viewed from radially outside and with respect to a circumferential direction of the spring ring (9, 10) a first run-in radius on one side and a second run-in radius on the circumferentially opposite side, wherein the second run-in radius is significantly smaller than the first run-in radius, wherein the second run-in radius is with respect to the cross section in the run-in plane (A) formed on a reducing section (43) of the cross section, and wherein the reducing section (43) has a branch (34) of approximately constant width in the continuing longitudinal extent of the spring strut (11).

4. The dispenser according to claim 3, wherein a spring strut (11) has the tendency to move radially inward or radially outward between the spring rings (9 and 10) in the course of a compression of the plastic spring (8) from its unloaded starting position.

5. The dispenser according to claim 4, wherein the radially inward or radially outward motion of the spring strut (11) is prevented by means of a radially inner and/or radially outer support formation on the dispenser (1).

6. The dispenser according to claim 3, wherein the spring struts (11) run into the lower and/or upper spring ring (9, 10) in a transition section (12), wherein a spring strut (11) furthermore has a central longitudinal axis (z) that follows the curved extent of the spring strut (11).

7. The dispenser according to claim 6, wherein, with respect to a run-in plane (A) extending perpendicular to the central longitudinal axis (z), the transition section (12) has in the run-in region into the spring ring (9, 10) a width (b"), which is greater than a width in a cross-sectional region located in the approximate center of the longitudinal extent of the spring strut (11) by 30 percent or more.

8. The dispenser according to claim 3, wherein the reducing section (32) is in a view from radially outside essentially realized triangularly with circumferentially opposite rounded contours (35, 36).

9. The dispenser according to claim 3, wherein the width corresponds to half or less of a greatest width (b) in the triangular region (33).

10. The dispenser according to claim 9, wherein the branch (34) only extends over part of the longitudinal extent of the spring strut (11).

11. The dispenser according to claim 3, wherein a second triangular region (33) and/or branch (34) is formed on the opposite side starting from the upper spring ring (10).

12. The dispenser according to claim 11, wherein the branches (34) partially overlap along the longitudinal extent.

13. A dispenser (1) for dispensing flowable compounds (2) or liquid or paste-like compounds, comprising a storage reservoir (6) for accommodating the compound (2) and a dispenser pump (3) designed with a modular construction, wherein the dispenser pump (3) has an inlet channel and an outlet channel (26) and a pump chamber (4), which is delimited by valves (15, 16) on the inlet side and the outlet side, as well as a head piece (5), wherein the head piece (5) has a dispensing opening (42), wherein a restoring device (7) formed by a spring furthermore is provided between the head piece (5) and the storage reservoir (6), wherein the restoring device (7) furthermore is formed by a plastic spring (8) with a lower spring ring (9) and an upper spring ring (10), which are arranged substantially coaxial to one another, wherein a respective plane (E) spanned by the spring rings (9, 10) extends substantially perpendicular to a longitudinal axis (y) of the plastic spring (8), wherein the spring rings (9, 10) furthermore are compressibly connected to one another by spring struts (11) extending between the spring rings (9, 10), and wherein an intermediate ring (39), which extends substantially perpendicular to the longitudinal axis (y) of the plastic spring (8), furthermore is formed over the height (h) of the plastic spring (8), wherein the plastic spring (8) is closed in the circumferential direction by means of wall regions (41) that connect the spring struts (11) to the spring rings (9, 10).

14. The dispenser according to claim 13, wherein two or more intermediate rings (39) are provided, and wherein at least four spring struts (11) are distributed over the circumference and extend over a circumferential angle range of a spring ring (9, 10) of 90 degrees or less in the direction of the longitudinal axis (y).

15. The dispenser according to claim 3, wherein the spring struts (9, 10) extend over a circumferential angle range (v) of 10° or more.

16. The dispenser according to claim 13, wherein a longitudinal spring strut axis (w) is formed between the upper spring ring (10) and the lower spring ring (9) with respect to a circumferential extent of a spring strut (11), wherein said longitudinal spring strut axis is intersected by the spring strut (11) at least twice over the height (h) of the plastic spring (8).

17. The dispenser according to claim 13, wherein both ends (40) of the spring strut (11) run into the lower and upper spring ring (9, 10) on the same circumferential side referred to the longitudinal spring strut axis (w).

18. The dispenser according to claim 13, wherein a wall region (41) has a radial thickness (d") that corresponds to less than half and up to one-fiftieth of the radial thickness (d) of a spring strut (11).

\* \* \* \* \*